(12) United States Patent
Bunce

(10) Patent No.: US 7,758,405 B2
(45) Date of Patent: Jul. 20, 2010

(54) JIG

(76) Inventor: Philip Bunce, 9-15 Beverley Street, Portland, Victoria (AU) 3305

( * ) Notice: Subject to any disclaimer, the term of this patent is extended or adjusted under 35 U.S.C. 154(b) by 117 days.

(21) Appl. No.: 11/547,177

(22) PCT Filed: Mar. 24, 2005

(86) PCT No.: PCT/AU2005/000432

§ 371 (c)(1), (2), (4) Date: Sep. 8, 2008

(87) PCT Pub. No.: WO2005/095051

PCT Pub. Date: Oct. 13, 2005

(65) Prior Publication Data

US 2009/0053979 A1 Feb. 26, 2009

(30) Foreign Application Priority Data

Mar. 31, 2004 (AU) ............................... 2004901713

(51) Int. Cl.
*B24B 41/00* (2006.01)
(52) U.S. Cl. ...................................... 451/382; 451/365
(58) Field of Classification Search ................. 451/365, 451/381, 382, 367
See application file for complete search history.

(56) References Cited

U.S. PATENT DOCUMENTS

| 755,198 | A | * | 3/1904 | Webb | .......................... 384/126 |
|---|---|---|---|---|---|
| 2,713,760 | A | * | 7/1955 | Dunham et al. | ............. 451/371 |
| 2,821,051 | A | * | 1/1958 | Franz | .......................... 451/276 |
| 3,336,654 | A | * | 8/1967 | Ryan | ............................ 29/429 |
| 4,216,628 | A | | 8/1980 | Wada | |
| 5,400,517 | A | | 3/1995 | McKendrick | |
| 6,099,504 | A | | 8/2000 | Gross et al. | |
| 7,361,163 | B2 | | 4/2008 | Cohen | |
| 2002/0188251 | A1 | | 12/2002 | Staylor et al. | |
| 2003/0105430 | A1 | | 6/2003 | Lavi et al. | |
| 2003/0130619 | A1 | | 7/2003 | Safabash et al. | |

FOREIGN PATENT DOCUMENTS

| DE | 30 35 657 A1 | 5/1982 |
|---|---|---|
| DE | 195 04 368 | 8/1996 |
| DE | 199 16 212 | 10/2000 |
| DE | 101 59 068 A1 | 6/2003 |
| EP | 0 591 992 | 4/1994 |
| GB | 2 054 435 | 2/1981 |
| JP | 9-29572 | 2/1997 |
| JP | 2003-231032 | 8/2003 |
| WO | WO 97/00702 | 1/1997 |

(Continued)

*Primary Examiner*—Robert Rose
(74) *Attorney, Agent, or Firm*—Merchant & Gould P.C.

(57) ABSTRACT

A jig intended in use to hold a set of blanks of rod-like or wire-like form during machining, said jig having a body adapted to be mounted to a drive shaft for rotation of the body about an axis of rotation, the body having an outer portion and an inner portion wherein the inner and outer portions are capable of angular displacement relative to each other, the portions having opposed faces which are concentric and which define clamping faces which in use are intended to support the set of blanks such that their central axes are substantially parallel to the axis of rotation and at least one end extends axially beyond the body.

10 Claims, 3 Drawing Sheets

FOREIGN PATENT DOCUMENTS

| WO | WO 98/19723 | 5/1998 |
| WO | WO 00/25842 | 5/2000 |
| WO | WO 02/089680 | 11/2002 |
| WO | WO 03/092771 | 11/2003 |
| WO | WO2004/065036 A1 | 8/2004 |
| WO | WO 2005/095051 | 10/2005 |

* cited by examiner

JIG

FIELD OF THE INVENTION

This present invention relates to the manufacture of elongate elements which require a treatment such as machining, grinding and like treatment. Such elongate items can include hypodermic needles and other small diameter components such as trephines or trocars, and more particularly to the machining of hypodermic needles and other small diameter components from blanks.

BACKGROUND

The lancing action of a hypodermic needle, often referred to as a "blade", is generally facilitated by three bevels, or facets, ground on an end portion of a tubular blank ("tube") from which the blade is formed. These typically comprise a primary facet and two secondary facets, resulting in the blade having three distinct facet intersections when viewed axially. The sharpness of the angle between these ground facets, between each facet and the blade's curved surfaces, along with other factors such as the diameter and thickness of the blade, effect the levels of patient comfort experienced in use.

Despite the number of blades being consumed by the world's populace continuously increasing over the last fifty years, the manner in which they are mass-produced has developed little in the same period. Typically a linear jig holding up to 1,000 tubes is used. The tubes are clamped between two flat plates of the jig and arranged adjacent one another such that their longitudinal axes are parallel, with one end of each of the tubes extending out from the jig in a direction orthogonal to the axis of a grinding wheel. The amount each tube extends out is governed by such factors as the tolerance of the grinding operation, the amount of material to be removed, and the tube material and dimensions.

During grinding of the blades, the jig traverses the length of the grinding wheel to progressively expose all of the tubes clamped in the jig to the grinding wheel. The primary facet is first ground adjacent the ends of all of the tubes, typically with twelve traverses of the linear jig across the face of the grinding wheel, advancing the jig closer to the grinding wheel at the completion of each traverse. Next, one of the flat plates of the jig clamping the tubes is moved relative to the other in a direction orthogonal to the longitudinal axis of the tubes to roll the tubes uniformly through a predetermined angle. This time with only two traverses across the grinding wheel, a first secondary facet is ground adjacent the end of each tube. The tubes are then further rolled about their longitudinal axes through a predetermined angle, and a further secondary facet having a shape corresponding to the first secondary facet is ground, again in two traverses.

Manufacturing blades by this process presents several difficulties. The linear jig relies on achieving parallel alignment of adjacent tubes, with the ends of the tubes between the clamping plates extending out from the jig orthogonal to the longitudinal axis of the grinding wheel, and a uniform clamping pressure being applied to all of the tubes. Precise grinding further depends on accurately rolling the tubes while maintaining this orthogonal angle of the tubes to the grinding face of the grinding wheel. Initial misalignment of the tubes results in inconsistencies between blades ground in the same and different batches, and these inconsistencies and errors are magnified when the tubes are rolled between the grinding of the different facets. This initial misalignment is both difficult to detect and to remedy, being expensive in terms of time to correct, wasted tubes and/or reduced or inadequate quality of the ground blades.

When manufacturing needles for use in certain types of safety syringes that require a slit or flat to be machined in the tube for co-operation with related structure in the body of the syringe, the slit or flat requires a precise alignment with the primary facet. Current practice for the machining of these slits or flats is to employ another operation subsequent to the grinding of the facets, wherein the blades are re-orientated for the further machining operation. This makes the machining of the slits or flats quite a time-consuming operation. This operation becomes further complicated by the need to avoid touching the ground ends of the tubes to determine the exact locations of the already ground facets, as this has the adverse effect of blunting the ground facet edges.

The conventional method of manufacturing blades using a linear jig results in the grinding wheel having wear greater at its axial end sections than at its middle section, resulting from the horizontal traverses of the jig wherein the tubes first come into contact with the wheel at the axial ends of the wheel. Hence, there is a tendency for the grinding wheels to develop a tapered sectional profile from the middle to either end of the wheels which in turn means that the grinding wheels need to be regularly dressed back to a cylindrical profile.

Further, because grinding occurs largely at the two regions adjacent the axial ends of the grinding wheel, there is a tendency for the temperature of the grinding wheel to build up at these regions, even with the substantive use of coolants. With continuous grinding, these "hot spots" can result in the grinding wheel wearing down quicker and a glazing of the grinding wheel in these regions causing possibly the burning of the blades around the regions of the ground facets, and necessitating further dressing of the wheel thus reducing the life of the wheel.

Typically, for each batch of tubes sixteen traverses of the longitudinal length of the grinding wheel by the linear jig are required for grinding the primary and secondary facets. After each traverse of the linear jig across the grinding wheel the linear jig must be stopped and restarted in the opposite direction. This substantive number of traverses of the linear jig, in combination with the stop/start nature of these traverses, makes it a relatively inefficient process.

The above description in relation to the background of the manufacture of hypodermic needles is not intended to be limiting on the scope of the invention but is merely for the purposes of enhancing an understanding of the present invention.

The reference to any prior art in this specification is not, and should not be taken as, an acknowledgement or any form of suggestion that that prior art forms part of the common general knowledge in Australia or the world.

DISCLOSURE OF THE INVENTION

Accordingly the invention resides in a jig intended in use to hold a set of blanks of rod-like or wire-like form during machining, said jig having a body adapted to be mounted to a drive shaft for rotation of the body about an axis of rotation, the body having an outer portion and an inner portion wherein the inner and outer portions are capable of angular displacement relative to each other, the portions having opposed faces which are concentric and which define clamping faces which in use are intended to support the set of blanks such that their central axes are substantially parallel to the axis of rotation and at least one end extends axially beyond the body.

According to a preferred feature of the invention the clamping faces are defined by a set of stations located around the axis of rotation, each station having a sector of the clamping face of each portion.

According to a preferred feature of the invention, one or more stations are arranged around the axis of rotation.

According to a preferred feature of the invention, the outer clamping face is provided on the inner face of the outer portion and the inner clamping face at each station is provided by a shoe member supported from the inner portion, the shoe member having an arcuate outer face which defines the inner clamping face.

According to a preferred feature of the invention the shoe member is supported on the inner portion for radial movement relative to the outer clamping face to effect clamping of the blanks between the opposed clamping surfaces, a biasing means between each shoe member and the inner portion to bias the inner clamping face into clamping engagement with the outer clamping face. According to a preferred feature of the invention the driving means comprises a set of springs. According to an alternative preferred feature of the invention the driving means comprises a hydraulic drive.

According to a preferred feature of the invention said shoe member is removable from the jig.

According to a preferred feature of the invention the surface jointly defined by the clamping surfaces is cylindrical whereby the axes of the blanks clamped therebetween will extend parallel to the axis of rotation of the jig. According to alternative preferred features of the invention the surface jointly defined by the clamping surfaces may be conical whereby the axes of the blanks clamped therebetween will have an inclination relative to the axis of the jig.

The rotary jig according to the invention is not restricted to use in grinding blanks for forming hypodermic needles, but also has a more general applicability for use in machining blanks for other uses, such as surgical lances, trephines or trocars. In addition the invention can have application to the machining of any form of elongate element and need not be restricted to the production of items intended for medical use. Machining operations which can be carried out while the blanks are held by the jig can include, grinding, laser cutting, waterjet cutting and milling.

The invention will be more fully understood in the light of the following description of several specific embodiments.

BRIEF DESCRIPTION OF THE DRAWINGS

The description is made with reference to the accompanying drawings, of which.

DETAILED DESCRIPTION OF SPECIFIC EMBODIMENTS

Figure 1:
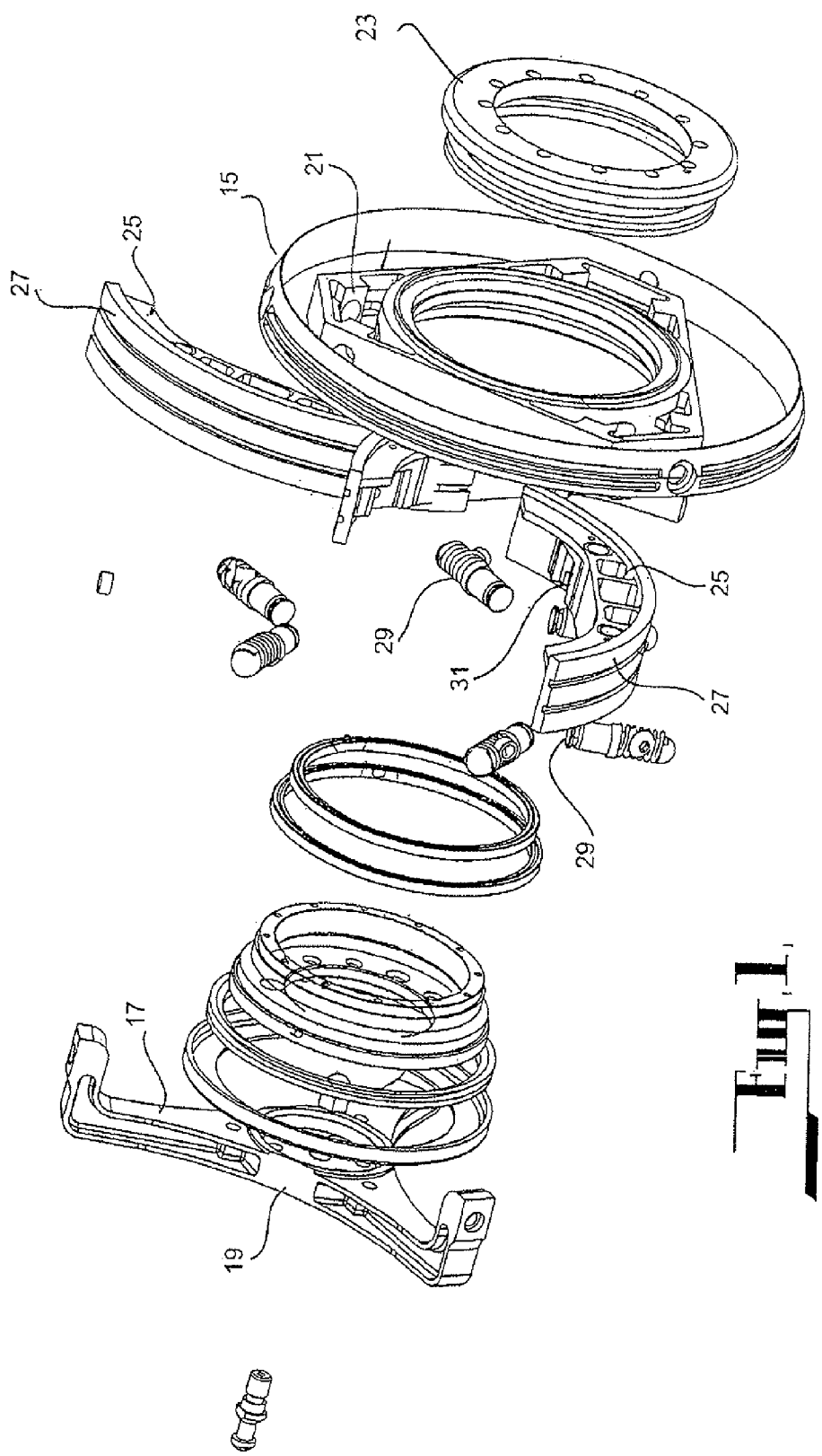
FIG. 1 is an exploded perspective view of a rotary jig according to the first embodiment of the present invention.
Figure 2:
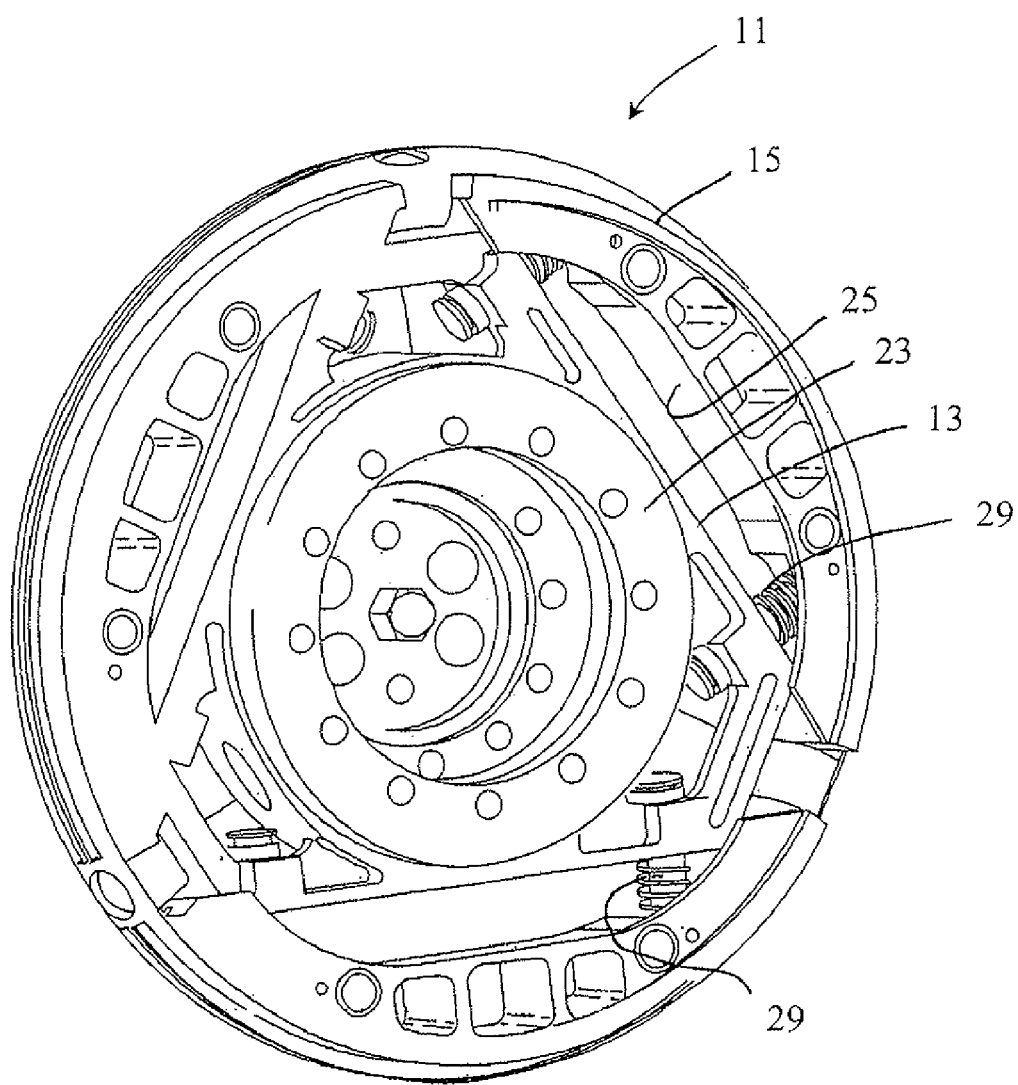
FIG. 2 is an isometric view of the front face of the jig according to the first embodiment.
Figure 3:
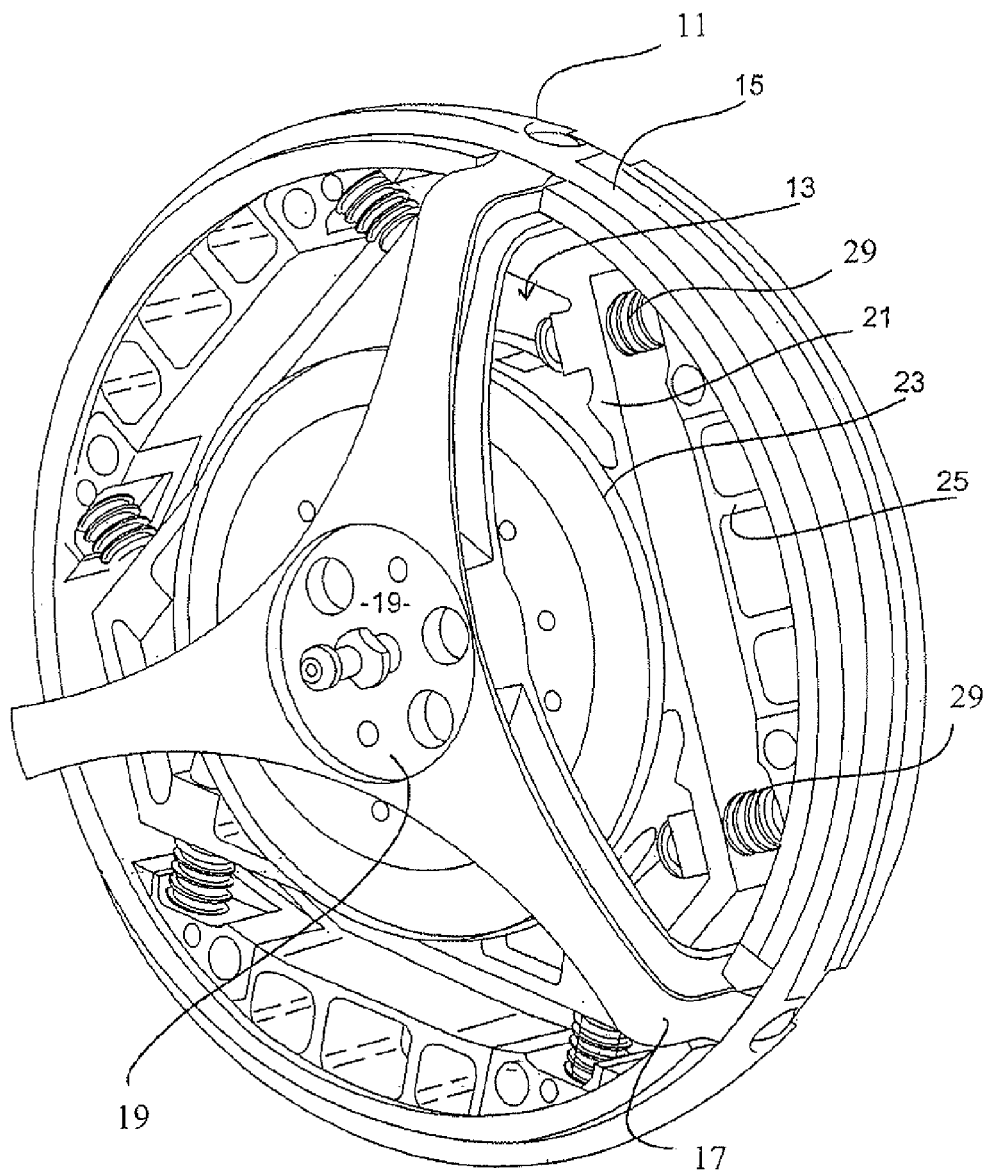
FIG. 3 is an isometric view of the rear face of the jig according to the first embodiment.

The first embodiment is directed to a development of one of the embodiments described in International application PCT/AU2004/000090.

The first embodiment comprises a jig which can be utilised in the manufacture of needle blanks for the introduction of needles which can be used with hypodermic syringes. The jig according to the embodiment is intended for use with a drive of the form disclosed in copending patent application filed this day in the name of the applicant which is entitled "Drive" the contents of which are included by reference.

The jig comprises two portions being an outer portion 11 and an inner portion 13 which are capable of rotation about a central axis relative to each other. The outer portion comprises an annular rim 15 which is supported from a first yoke comprising three arms 17 interconnected at the centre 19 of the jig. The centre of the first yoke is adapted to be mounted to the drive shaft of the drive. The inner portion comprises a second yoke 21 which is of a generally triangular configuration and which is rotationally supported from first yoke through a hub assembly 23.

The faces of the second yoke 21 each support a clamping shoe 25 which has an outer arcuate face 27 which is intended to be in opposed relationship with the inner face of the rim 15 whereby the inner face of the rim 15 and the arcuate face 27 of the clamping shoes 25 define the clamping surfaces. Each shoe is supported from the respective face of the inner yoke by a pair of spaced locking members 29 and the pins are supported from the second yoke to be slidable inwardly and outwardly from the respective face. The pins of each locking member are biased to their outermost position by springs or other biasing means which are received around each of the pins. The outermost ends of each of the pins are formed with a head which is receivable in apertures 31 provided on the inner face of the shoes 31. With axial retraction of the pins against the biasing force provided by the springs or other biasing means the pins are withdrawn from engagement with the apertures provided on the inner face of the shoe to enable the shoes to be removed from the jig.

Each of the shoes is further provided with an axial opening which is intended to be received by a retaining peg member provided on the drive head of the drive with which the jig is to be associated and which are to positively engage with the inner portion to effect of rotation of the inner portions and shoes relative to the outer rim.

In use the jig is intended to be removable from the drive head and the shoes are removable from the jig by retraction of the pins 29. When the shoe has been removed the needle blanks can the be applied to the outer arcuate face 27 of the shoe and retained in place by a suitable adherent. With the needles in place the shoe can then be located into supporting relationship on the second yoke 21 and the pins engaged with the inner face of the shoe member to bias the shoe member into clamping engagement with the outer rim 15 and thereby retain the needles in place.

In use it is intended that the mounting and dismounting of the jig from the drive can be effected by utilisation of a suitable robot facility which would then be able to deliver the jigs to a delivery station at which the shoe members can be removed and freshly loaded shoes installed in the jig for relocation into the drive.

While the rotary jig 11 according to the embodiment described above is particularly suited to the grinding of tubes for use as hypodermic needles, the use of the rotary jig according to each of the embodiments and the invention are not limited to the such. The rotary jig according to the embodiment and the invention can be used in processing of rod or tube-like members and can be used in association with any suitable grinding arrangement or an arrangement utilising any other applicable form of machining and grinding such as laser cutting, waterjet cutting, or milling.

According to a second embodiment of the invention the pins 29 of the first embodiment are driven hydraulically. To effect this the second yoke 21 is provided with chambers which are associated with a master piston which is actuable form the exterior of the yoke to be movable into and out of the chamber and each of the pins 29 are formed at their inner end to be in the form of slave pistons whereby they will move in accordance with the action of the master piston. The master piston is caused to move through a drive screw which is threadably supported by the yoke and which can bear on the master piston. In addition the driving axis of the pins for each shoe is substantially parallel to the central radial axis of the shoe.

The embodiment of the present invention has been described by way of example only and modifications and variations may be made without departing from the spirit and scope of the invention described.

Throughout the specification, unless the context requires otherwise, the word "comprise", and variations such as "comprises" or "comprising", will be understood to imply the inclusion of a stated step or integer or group of steps or integers but not the exclusion of any other step or integer or group of steps or integers.

The invention claimed is:

1. A jig intended in use to hold a set of blanks of rod-like or wire-like form during machining, said jig comprising a body adapted to be mounted to a drive shaft for rotation of the body about an axis of rotation, the body having an outer portion and an inner portion wherein the inner and outer portions are capable of angular displacement relative to each other, the portions having opposed faces which are concentric and which define clamping faces which in use are intended to support the set of blanks such that central axes of blanks of the set of blanks are substantially parallel to the axis of rotation and at least one end extends axially beyond the body.

2. A jig as claimed at claim 1, wherein the clamping faces are defined by a set of stations located around the axis of rotation, each station having a sector of the clamping face of each portion.

3. A jig as claimed at claim 1, wherein one or more stations are arranged around the axis of rotation.

4. A jig as claimed at claim 2, wherein an outer clamping face is provided by an inner face of the outer portion, and at each station an inner clamping face is provided by a shoe member supported from the inner portion, the shoe member having an arcuate outer face which defines the inner clamping face.

5. A jig as claimed at claim 4, wherein the shoe member is supported on the inner portion for radial movement relative to the outer clamping face to effect clamping of the blanks between the opposed clamping faces, and the jig further comprises a biasing means between each shoe member and the inner portion to bias the inner clamping face into clamping engagement with the outer clamping face.

6. A jig as claimed at claim 5, wherein the biasing means comprises a set of springs.

7. A jig as claimed at claim 5, wherein the biasing means comprises a hydraulic drive.

8. A jig as claimed at claim 4, wherein each shoe member is removable from the jig.

9. A jig as claimed at claim 1, wherein the clamping faces are substantially cylindrical such that axes of the blanks clamped therebetween extend parallel to the axis of rotation of the jig.

10. A jig intended in use to hold a set of blanks of rod-like or wire-like form during machining, said jig comprising a body adapted to be mounted to a drive shaft for rotation of the body about an axis of rotation, the body having an outer portion and an inner portion wherein the inner and outer portions are capable of angular displacement relative to each other, the portions having opposed faces which are concentric and which define substantially conical clamping faces which in use are intended to support the set of blanks such that central axes of blanks of the set of blanks are inclined relative to the axis of rotation and at least one end extends axially beyond the body.

* * * * *